Nov. 15, 1966    W. A. McCORMICK, JR    3,284,958

METHOD AND APPARATUS FOR DEFLASHING PNEUMATIC TIRES

Filed April 27, 1964    3 Sheets-Sheet 1

INVENTOR
William A. McCormick, Jr.

BY Connolly and Hutz
ATTORNEYS

Nov. 15, 1966  W. A. McCORMICK, JR  3,284,958
METHOD AND APPARATUS FOR DEFLASHING PNEUMATIC TIRES
Filed April 27, 1964  3 Sheets-Sheet 3

INVENTOR
William A. McCormick, Jr.

BY Connolly and Hutz
ATTORNEYS

United States Patent Office 3,284,958
Patented Nov. 15, 1966

3,284,958
METHOD AND APPARATUS FOR DEFLASHING PNEUMATIC TIRES
William A. McCormick, Jr., Hagerstown, Md., assignor to The Pangborn Corporation, Hagerstown, Md., a corporation of Delaware
Filed Apr. 27, 1964, Ser. No. 362,911
5 Claims. (Cl. 51—14)

The present invention relates to a method and apparatus for removing flashing from large molded articles, particularly for removing vent tips from molded tires.

Recently, a method and apparatus has been developed (Patent No. 3,110,983) for deflashing rubber pieces by loading the pieces in a treating area and ventilating the area while a freezing medium such as carbon dioxide is applied to the pieces to freeze the flashing on the pieces as they are continuously turned and rotated. The pieces are then blasted with abrasive to remove the flashing.

Although the above method and apparatus is successful in deflashing molded articles, in general, it has not been used for the specific application for removing air vent tips from, for example, molded pneumatic tires. These tips are formed during the molding process from the air vents in the mold and protrude from both the tread and side walls having lengths of about ¾ inch with diameters of about $\frac{1}{16}$ inch to $\frac{1}{8}$ inch. Heretofore, these tips have been removed by rotating the tires through a series of knives. However, with this process the results are frequently unsatisfactory.

One object of the present invention is to provide a new and novel apparatus and method for removing tire vent tips by embrittling the tips while merely surface freezing the tires.

Other objects and advantages of the invention will become more apparent from a study of the following description and drawing wherein.

Figure 1:
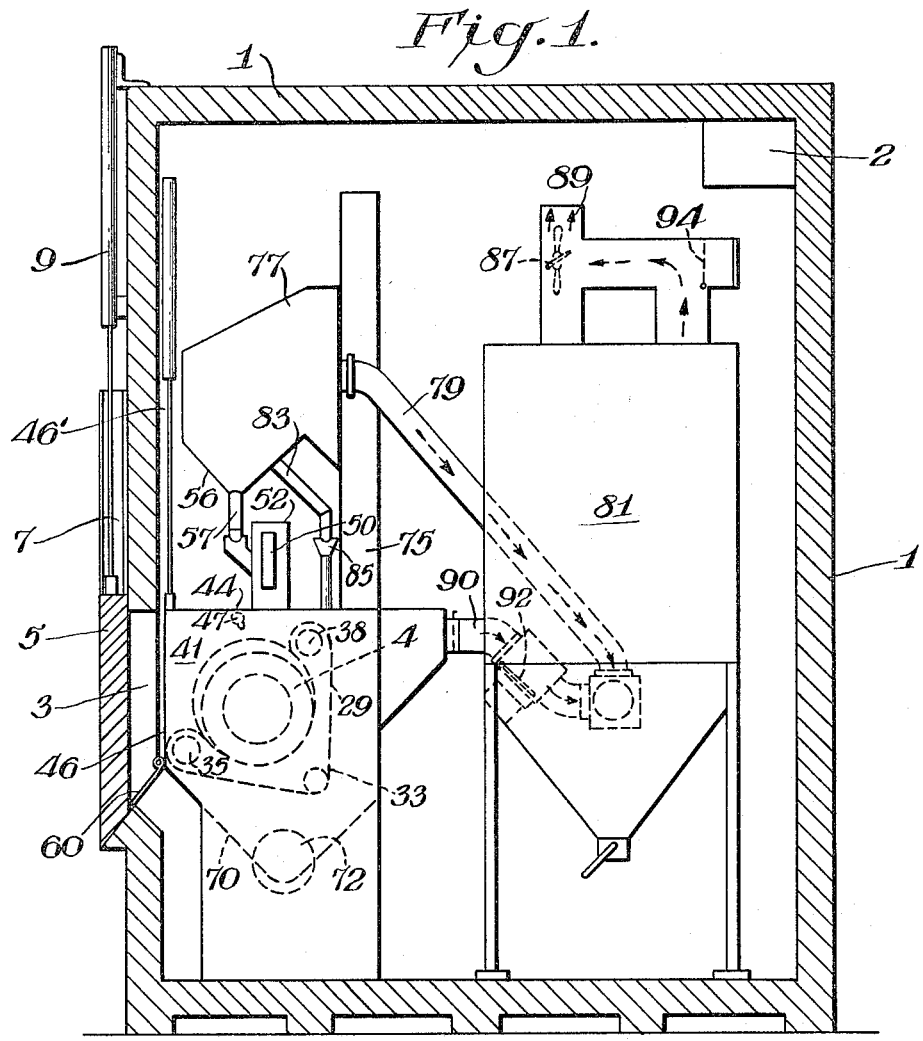
FIG. 1 is a section of one embodiment of this invention.

Referring now to FIG. 1, which shows the general makeup of the apparatus, an overall housing 1 is provided and serves as a dehumidifying or refrigeration chamber in which the operating units of the apparatus are housed. As shown in FIG. 1, the housing 1 has heavy wall panels which are preferably formed of inner and outer sheets of plywood which form a sandwich structure with insulation such as fiberglass positioned between the plywood sheets. The exterior of the housing 1 is clad with galvanized steel backers or sheets. A refrigeration evaporator 2 is supported in the upper right hand corner of the housing.

In the front wall of the housing, there is a loading and unloading doorway 3 for loading and removing the rubber parts or tires from within the housing. The door 5 of the housing 1 is raised and lowered in tracks 7 by the hoisting mechanism generally indicated at 9 to expose and close off doorway 3.

Figure 2:
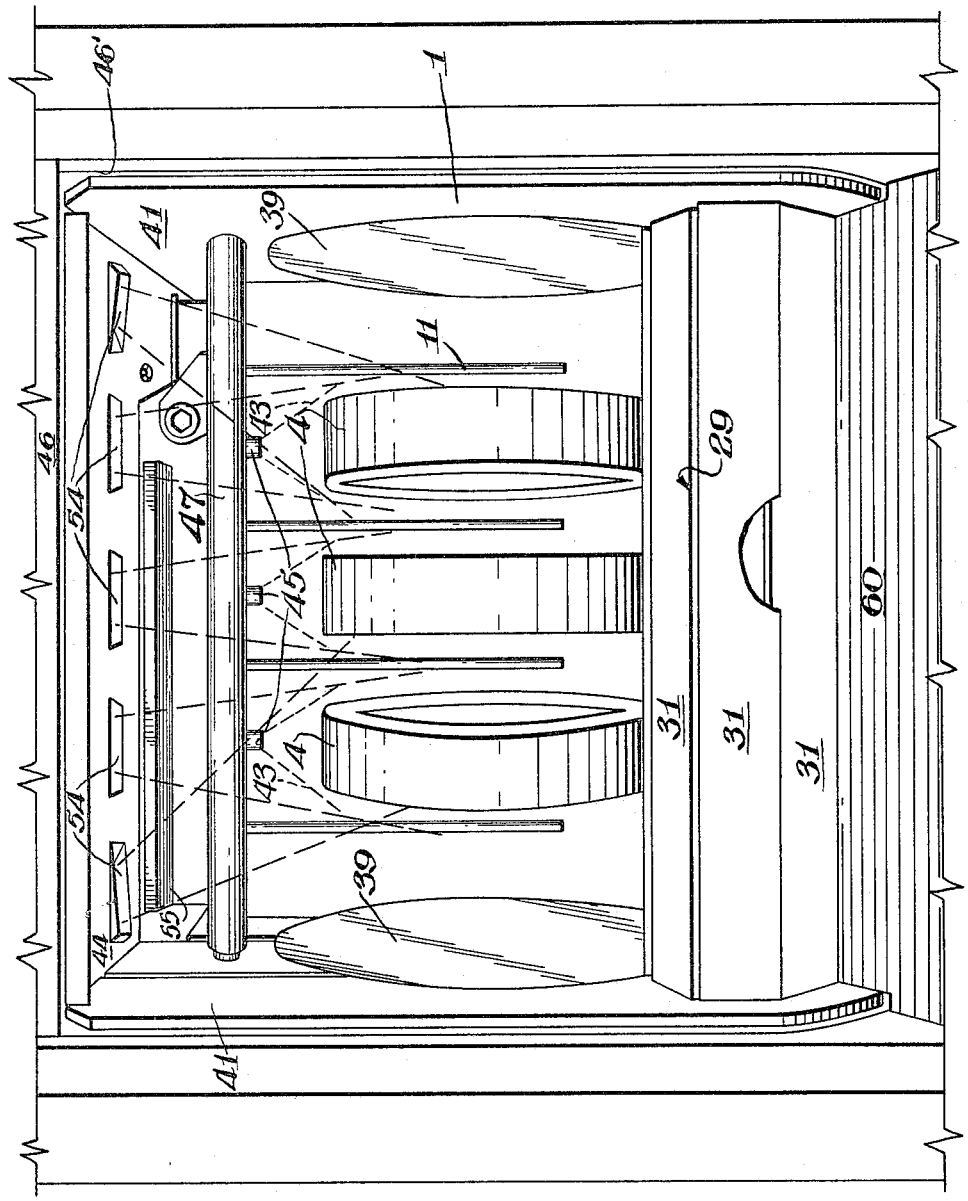
FIG. 2 is a view on an enlarged scale of a portion of the embodiment shown in FIG. 1.

The rubber tires 4, for example, are received by a trough shaped endless belt type conveyor 29 as shown in FIGS. 1 and 2. The conveyor 29 is formed of metal bars or slats 31 (FIG. 2) which extend transversely of the conveyor travel and are connected at their ends to a continuous sprocket chain 33 (FIG. 1). The conveyor rotates around a front pair of guide sprockets 35 and a pair of rear drive sprockets 38. A pair of guide discs 39 are rotatably mounted in side walls 41 which enclose the sides of the conveyor trough area to provide contact with the slats 31 of the upper deck of the conveyor 29 to compel the conveyor 29 to follow a concave path which resembles a trough laterally inclined so that it faces the doorway 3.

The operation of the conveyor 29 is part of the cycle controlled from a panel (not shown) on the outside of housing 1. The endless conveyor may also be formed of a wire mesh belt instead of the bars or slats as shown. The conveyor area also includes a door 46 which is opened automatically through the control panel during the loading and unloading operation but which is closed during the freezing and abrasive treatment. Briefly, this door consists of an upper rigid portion having a lower flexible portion. The door 46 is supported by rollers in door tracks 46 which bend inwardly adjacent the bottom of the tracks. Since the lower portion of the door 46 is flexible, it follows the curved pathway defined by the lower curved portion of the tracks. The trancks 46' for the door 46 extend upwardly above the roof of the conveyor area to accommodate the door in its opened position. These structural details of the door are better shown in Patent No. 3,048,947; however, other suitable doors can be used.

Figure 5:
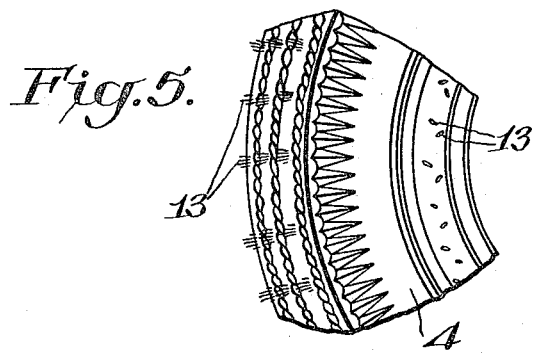
FIG. 5 is a perspective of a tire casing before the vent tips are removed.

After the rubber pieces or tires 4 (see FIG. 5) are loaded in the conveyor and before they are trimmed or deflashed, they are treated with a freezing medium 43 which can be liquid carbon dioxide, pulverized Dry Ice or other suitable freezing mediums. Liquid nitrogen applied at approximately —300° F. by spray headers 47 (FIG. 2) through nozzles 45 at the surface of tires 4 is particularly effective in causing almost instantaneous embrittlement of the vent tips. Common header 47 extends through and is supported by the side walls 41 enclosing the conveyor area. Positioning rods 11 secured to header 47 maintain tires 4 upright and spaced from each other with the tops of the tires closely adjacent to nozzles 45. The conveyor 29 is in operation during the freezing step whereby the tires 4 are tumbled and turned to expose all surfaces to the freezing action.

Again, the application of the freezing medium 43 to the work pieces 4 occurs in a definitely timed cycle controlled by or through the control panel. Maintaining the tires 4 upright and spaced during the freezing operation assures that each segment of the vent-tip containing sidewalls and treads will be rotated closely adjacent to nozzles 45. This, in turn, assures that vent tips 13 (FIGURE 5) on the sidewalls and treads are completely embrittled in the minimum amount of time, while the tire itself is only surface frozen to toughen it. Tires 4 are thus differentially frozen. This means that the vent tips 13 are frozen to a brittle state while the thicker portions of the rubber tires 4 are not completely frozen and therefore still retain some of their resiliency. With this arrangement, the brittle tips 13 are easily removed by the abrasive action whereas the thicker portions of the pieces are not damaged or otherwise abused by the abrasive action.

After the rubber pieces or tires 4 have been differentially frozen in the manner above, they are then exposed to the next step of the cycle which is the abrasive treating cycle. As shown in FIG. 1 a rotary wheel 50 is supported in a housing 52 attached to the roof-top or wall 44 which joins the side walls 41 of the conveyor area to cover the top of the conveyor area. The wheel 50 is rotated at high speed by a motor (not shown) to propel abrasive media such as fine steel shot through openings 54 (FIG. 2) in the roof top 44 and against the frozen rubber pieces supported in the trough shaped conveyor. During the abrasive applying step, plugs (not shown) are automatically withdrawn from the openings 54. A baffle plate 55 extending horizontally from the freezing medium supply header 47 prevents abrasive from striking the header 47. The abrasive media is supplied to the blasting wheel 50 through storage bin 56 connected by passageway 57 to the wheel itself.

For further detailed description of the rotary blast wheel itself, reference is made, for instance, to Patents Nos. 2,869,289, 2,732,666, and 3,197,920 as well as patent application Serial No. 221,100 filed September 4, 1962, now abandoned. Any type of wheel assembly may be used however.

Because tires 4 are maintained upright and spaced during the abrasive application, vent tips 13 are completely removed. The central openings or nozzles 54 apply the abrasive media normally or directly at the tire tread, as shown in FIG. 2, while the end most openings or nozzles 54 apply the abrasive media at an angle and toward the center of the abrasive treating area to deflash tips 13 from the sidewalls of all tires 4.

It should be noted, as mentioned above, that during both the freezing step and the abrasive action step, the sprockets 35 and 38 are driven by a suitable motor drive mounted externally of the side walls 41 which enclose the conveyor area. This action causes the tires to rotate and otherwise change position whereby all of the treads and sidewalls of the tires are adequately exposed or subjected to both the freezing and abrasive treatment.

After the abrasive action has ceased, both the outer door 5 and the inner door 46 are automatically raised to open position. The direction of travel of the conveyor 29 is reversed and as seen in FIGS. 1 and 2 the rubber tires 4 drop into a slide plate 60 from which point they slide outwardly through the doorway 3 onto an unload conveyor (not shown). This slide plate 60 is automatically moved into position when the unloading step of the cycle begins. After the rubber pieces are unloaded, the slide plate is then automatically retracted away from the conveyor 29 to permit the inner door 46 to close. This extension and retraction operation is controlled preferably by a carbon dioxide pressure cylinder operated through the control panel.

The abrasive and vent tips that have been removed from the tires in the trough conveyor 29 drop through the slats 31 which make up the conveyor 29 and onto a screen slide or chute 70 (FIG. 1) which permits only the abrasive and finer pieces of flashing or vent tips to pass. This abrasive drops onto a screw conveyor (not shown) or other conveying means and is fed to a scalping drum 72. In the scalping drum, the abrasive is further refined from the removed vent tips with the vent tips discharged through the refuse discharge into a collection box which can be removed and emptied by the user.

The specific structure of the scalping drum is described in Patent Nos. 2,771,189 and 3,087,615. From the scalping drum 72, the abrasive from which the larger pieces of vent tips have been removed is passed into an elevator 75 which raises the abrasive upwardly to a separator 77 of an air wash type. The supply air for the separator is provided by the suction air being discharged from the dust collector which is described hereinafter. Here, the abrasive passes through a stream of air whereby the vent tips and other light-weight contamination are removed. The specific structure of the separator can be that shown in Patents Nos. 2,771,189 and 3,227,327.

From the separator 77, the abrasive then passes down into storage bin 56 for the abrasive from which it passes through conduit 57 to the abrasive throwing wheel 50. The conduit 57 includes a suitable metering and purge gate assembly (not shown) for metering the abrasive to the wheel. This gate is disclosed and claimed in Patent No. 3,227,327. Briefly, it is formed of an element having a blade extending therefrom which meters the flow of abrasive. When jammed, an air cylinder operated directly by a depressable button from the control panel rotates the element to move the blade out of jammed position. At the same time another blade on the element moves into metering position.

To further clean the abrasive, if necessary, a portion of the abrasive is branched off from the storage bin 56 through a feed pipe 83 to a shaker conveyor wherein the abrasive passes through a screen onto a solid plate positioned below the screen from which point it is returned to the blast wheel 50 or storage bin 56. Alternatively, a portion of the abrasive is branched off from the storage bin 56 through a feed pipe 83 to a screw conveyor (not shown) or other conveying means, and is fed to the scalping drum 72 to be recirculated through the cleaning means, said scalping drum 72, and separator 77 of an air wash type.

From the separator 77, the moving air stream containing the contamination removed from the abrasive in the separator 77 passes through delivery pipe 79 into a dust collector or filter assembly 81.

The dust laden air stream is then filtered through a series of dust bags (not shown) with the air stream being drawn by the fan 87 mounted on top of the dust collector. The air is discharged through opening 89. Suitable dust collectors can be found in Patents Nos. 3,053,031, 2,667,233 and 2,876,862.

Contaminated air is also fed to the dust collector 81 through outlet 90 leading off from the area adjacent the conveyor 29.

It should be pointed out that when loading and unloading occurs, the ventilation of the trough conveyor through outlet 90 is cut off by damper 92 located in line 90. This prevents drawing warm air from outside the housing into the cooled system. The damper 92 must be open during the blasting operation to provide ventilation. However, it is also closed during the liquid carbon dioxide or liquid nitrogen application against the tires 4 to prevent drawing the cooling air thus interfering with the freezing operation. The damper operation is controlled by a carbon dioxide valve which is incorporated into the operation cycle through the control panel. When the damper 92 is closed, the air coming from the conveyor 29 area is by-passed to draw air from the housing interior in order to maintain a constant flow to the air separator 77. Damper 94 positioned atop dust collector 81 is also closed and by-passed to the housing interior in a timed cycle.

Figure 3:
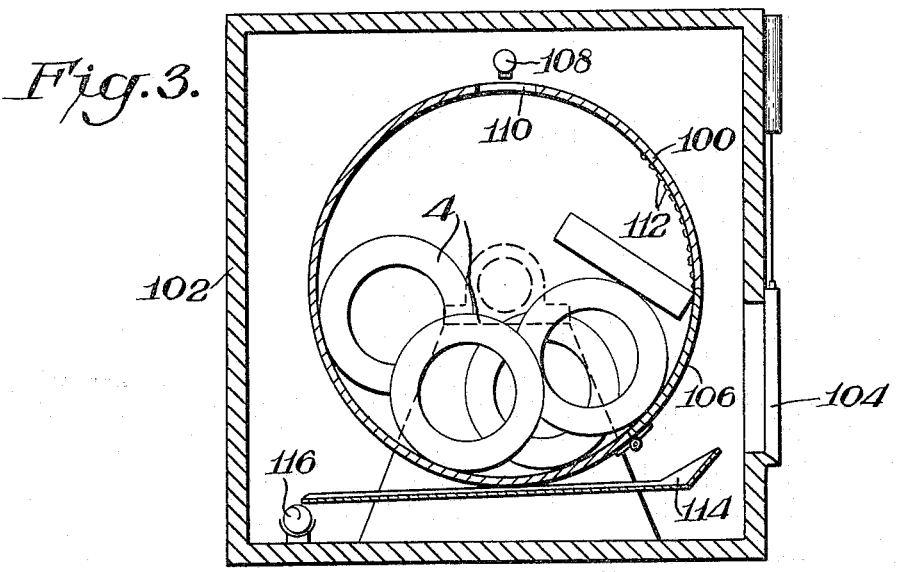
FIG. 3 is a section of an alternative apparatus for removing the vent tips.

FIG. 3 shows another apparatus for removing vent tips 13 from tires 4. Tires 4 are placed in tumbling cylinder 100 inside sealed chamber or treating area 102 through door 104 in chamber 102 and door 106 in cylinder 100. The freezing medium such as liquid nitrogen is applied from spray header or nozzle 108 through hole 110 in cylinder 100 prior to the cylinder rotating. Cylinder 100 is sufficiently small so that tires 4 are mounted close to spray header 108 regardless of their position in cylinder 100. After vent tips 13 on the tread and sidewalls of tires 4 have embrittled, tips 13 are broken off by coming into contact with inner abrasive surface 112 of tumbling chamber 100 or by coming into contact with each other. Vent tip catcher 114 mounted under cylinder 100 catches the vent tips that fall through opening 110 as cylinder 100 is rotated. From catcher 114 the vent tips fall for example into a conveyor 116.

Figure 4:
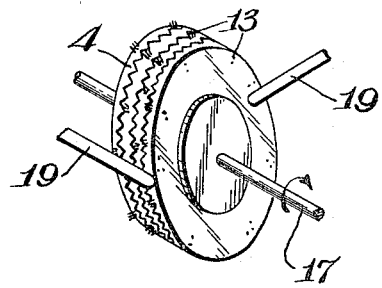
FIG. 4 is a diagrammatic view of still another alternative apparatus.

FIG. 4 shows still another apparatus for removing vent tips 13 from tires 4. As shown in FIG. 4, each tire 4 is mounted on rotatable shaft 17 substantially parallel to and spaced from the other tires (not shown) in a sealed chamber or treating area (not shown). As described above, the freezing medium is applied closely to the tread and sidewalls to embrittle vent tips 13 of tires 4. The embrittled vent tips are then removed from the tread and sidewalls of each tire 4 by appropriately shaped knives or edges 19 which cut or scrape vent tips 13 from tire 4.

Obviously, many modifications and variations of the present invention are possible in light of the above teachings. It is therefore, to be understood that within the scope of the appended claims the invention may be practiced otherwise than as specifically described.

What is claimed is:

1. Apparatus for deflashing vent tips from molded tires comprising a dehumidifying housing, means supported within said housing for simultaneously supporting and turning said tires, a freezing medium applicator within said housing adjacent said tire supporting and turning means for applying freezing medium to said tires to lower the temperature of said tires, positioning means in said housing for maintaining said tires substantially upright and spaced from each other with a portion of the tread and sidewalls near said freezing applicator means whereby all of the tread and sidewalls is moved close to said freezing medium applicator as said tires are rotated by said supporting and turning means, and abrasive blasting means supported in said housing adjacent said tire supporting and turning means for propelling abrasives against the tread and sidewalls of said tires to remove the vent tips therefrom.

2. The apparatus of claim 1 wherein said abrasive blasting means includes abrasive nozzles directed normal to said substantially upright tires for propelling said abrasive against said tread of said tires, and abrasive nozzles disposed at an angle to said substantially upright tires for propelling abrasives at said sidewalls of said tires.

3. The apparatus of claim 2 wherein said normally disposed abrasive nozzles are between said inclined abrasive nozzles.

4. The apparatus of claim 1 wherein said freezing medium applicator includes a spray header disposed above said tires, and said positioning means comprising spaced projections on said spray header extending downwardly to maintain said tires substantially upright and spaced from each other.

5. The apparatus of claim 1 wherein said freezing medium is liquid nitrogen.

References Cited by the Examiner
UNITED STATES PATENTS

| | | | |
|---|---|---|---|
| 2,686,991 | 8/1954 | Powell et al. | 51—14 |
| 2,996,846 | 8/1961 | Leliaert | 51—13 |
| 3,110,983 | 11/1963 | Moore | 51—13 X |
| 3,137,101 | 6/1964 | Leliaert | 51—13 |

LESTER M. SWINGLE, *Primary Examiner.*